United States Patent Office 3,423,208
Patented Jan. 21, 1969

3,423,208
METHOD OF PRECIPITATING CASEIN FROM MILK
Arie Kuipers, Limburg, Germany, assignor to Josef A. Meggle, Reitmehring, Germany
No Drawing. Filed Feb. 17, 1966, Ser. No. 528,043
Claims priority, application Germany, Feb. 22, 1965, M 64,270
U.S. Cl. 99—20       7 Claims
Int. Cl. A23j 1/20

ABSTRACT OF THE DISCLOSURE

Production of casein by mixing skim milk with whey which has been contacted with a cation exchange material in the H-form so that the pH of said skin milk is reduced to 4.3 to 4.5 which causes precipitation of casein.

---

This invention relates to the processing of milk, and particularly to the precipitation of casein from skim milk.

The invention is more specifically concerned with the processing of cow's milk, and the term "milk" as employed hereinafter in the description of specific embodiments will be understood to refer to such cow's milk. The invention, however, is not necessarily limited to milk of any particular species and its application to the milk of other animals will be obvious to those skilled in the art.

Casein is precipitated from milk either by enzymes (rennet) or by pH adjustment to approximately 4.3 to 4.5, and this invention relates to an improved method of precipitating casein from milk by acidification. It is conventional to precipitate casein from milk by addition of acids, hydrochloric acid, sulfuric acid, or lactic acid being most commonly employed. The anions of these acids remain in the whey and reduce the value of the whey as a feed supplement and for other purposes. It has not been practical to avoid this disadvantage of conventional casein precipitation methods by the use of volatile acids such as carbonic acid as acidifying agents.

The primary object of the invention is a method of precipitating casein by pH adjustment of milk without contaminating the whey with the anions of acids employed for the adjustment.

A further object is the provision of such a method which is economically feasible at this time.

With these and other objects in view, the invention, in one of its aspects, mainly resides in contacting whey with a cation-exchange material in the hydrogen (H) form in such proportions that the pH of the whey is reduced to substantially less than 4.3. Enough of this contacted whey is then mixed with milk, usually skim milk, to make the pH of the resulting mixture approximately 4.3 to 4.5.

The whey contacted with ion-exchange material is preferably a recycled portion of the process whey resulting from precipitation of the casein from skim milk according to the method of this invention but whey of other origin may be employed, such as rennet cheese whey.

A modified method of the invention permits the utilization of rennet cheese whey or of other liquid dairy by-products containing valuable constituents which are readily recovered in the method of the invention.

The acid whey obtained after separation of the casein from the residual liquid in the basic step of this invention may be evaporated until lactose crystallizes therefrom. It is usually advisable to evaporate the process whey to a solids content of about 60 to 65 percent for this purpose. The mother liquor obtained after recovery of the lactose crystals is a viscous liquid which may be diluted with two to four volumes of rennet whey having a normal pH of about 6, whereby a mixture of pH 4.3 to 4.8 is obtained.

When this mixture is heated to 90°–95° C., albumin is precipitated and may be removed by filtration or centrifuging.

The residual liquid when contacted with cation-exchange material in the H-form reaches a pH value of less than 2, typically 1.8, and is then employed to advantage for precipitating casein from milk.

The following examples are further illustrative of the method of the invention, and it will be understood that the invention is not limited to the examples.

Example 1

1.000 lbs. skim milk were heated in a vat to 100° F., and the casein contained therein was precipitated by the addition of 650 lbs. process whey having a pH of 1.8 and prepared as described below, whereby the pH of the mixture was adjusted to 4.5. The precipitated casein was separated from the liquid remainder of the mixture by filtration and weighed 190 lbs. It contained 20% dry solids, and was washed and dried in the usual manner.

The 1460 lbs. of whey practically free of casein were divided into two portions. The major portion was used as a raw material in the manufacture of milk sugar by conventional methods, and a minor portion of 650 lbs. was cooled to a temperature somewhat below 60° F. and passed over a column charged with a strongly acid cation-exchange resin of the phenolsulfonic acid type in the H-form, whereby the potassium and sodium ions, and a portion of the calcium and magnesium ions in the whey, together with minor cationic constituents, were replaced by hydrogen ions.

The effluent from the resin treatment had a pH of 1.8. It was reheated to 100° F. and returned to the process for precipitating casein from the next batch of skim milk as described above.

Example 2

The pH of 1,000 lbs. skim milk was adjusted at 100° F. to 4.5 by the addition of 150 lbs. of a mixture of one part of a whey concentrate and four parts rennet cheese whey, prepared as described hereinafter. The casein precipitated thereby was separated from the remaining liquid by means of a vibratory screen. It weighed 200 lbs. and had a solids content of 20% prior to washing. It was further processed in a conventional manner.

The 950 lbs. of remaining liquid substantially free of casein contained 7% solids and were evaporated to a solids content of 63% and cooled to ambient temperature, whereby crystallization of lactose was induced. 40 lbs. crude wet lactose were recovered by centrifuging the concentrate. The viscous mother liquor of whey concentrate (65 lbs.) was partly evaporated to produce whey powder, a valuable feed supplement. The remaining 35 lbs. of concentrate which had a pH of 3.5 were diluted with 140 lbs. rennet cheese whey (pH 6.0). The mixture was heated to 185°–200° F. by introducing 15 lbs. live steam, whereby albumin was precipitated.

Filtration yielded 40 lbs. crude, wet albumin and 150 lbs. of a clear filtrate which was passed over the cation exchange resin described in Example 1, whereby its pH was lowered to less than 1.8. This material was returned to the process for precipitating casein from the next batch of skim milk. The albumin was dried and packed.

Unless albumin is removed from the whey prior to cation exchange treatment, it is necessary to perform the resin treatment at low temperature, as described in Example 1, in order to prevent fouling of the resin.

Example 3

150 lbs. skim milk were exaporated to 27% solids. 8 oz. each of sodium citrate and calcium citrate were added and the mixture was subjected to lactic acid fermentation with a pure culture of Lactobacillus cremoris at about 80° F. until a pH of 4.3–4.5 was reached, whereupon it was cooled, homogenized with 200 lbs. freshly precipitated casein obtained by the method of Example 1 but at 80° F. to produce soft curds, and with an amount of sour cream sufficient to satisfy legal requirements, packaged, and marketed as "Creamed Cottage Cheese".

The continuous batch method outlined above produces cottage cheese of excellent quality without requiring the fermentation of large amounts of milk, while yielding more useful whey than is available from conventional cheese making processes.

It will be appreciated that the specific chemical nature of the cation-exchange material employed for removing alkali and alkaline earth metal ions from whey or whey concentrate in the method of the invention is immaterial, as long as the material is acidic, that is, in the H-form, and insoluble in the whey, so as to substitute hydrogen for the metal ions. A small amount of free hydrochloric acid is formed thereby together with even smaller amount of phosphoric and citric acids, and insignificant amounts of other acids.

The pH of the effluent from the resin column is not in itself critical as long as it is lower than 4.3 A pH lower than 1.8 is not readily obtained in the presence of buffering complexes of calcium with phosphoric acid and albumin which are not decomposed by the cation exchange resin. The pH of the resin-treated whey has a direct bearing on the amount thereof necessary for precipitating casein from a given batch of ordinary skim milk. This amount should be as small as is practical, and is normally between approximately 9 and 15 percent by weight. Precipitation of casein from very dilute solutions results in an excessive amount of fine particles which cannot conveniently be separated from the whey by conventional methods, and tend to remain in colloidal suspension, thereby reducing the useful casein yield.

While it is possible to adjust the pH of the whey separated from the casein by contacting the whey without further pre-treatment with a cation-exchange resin in the H-form at a temperature low enough to prevent precipitation of albumin, it is preferred to remove the albumin and/or the lactose from the whey prior to the resin treatment. Example 2 illustrates a preferred method of recovering the albumin and lactose from the whey. Other methods of removing these constituents from the whey will readily suggest themselves to those skilled in the art, and may be resorted to without departing from the scope of this invention.

When the lactose is removed by partial evaporation of the whey until the lactose crystallizes, the mother liquor is too viscous to permit convenient separation of the subsequently precipitated albumin. The mother liquor therefore should be diluted and its pH raised to reduce solubility of albumin. Rennet cheese whey which normally has a pH near 6 may be admixed to achieve dilution and pH adjustment simultaneously, but other liquid dairy by-products are useful for the same purposes. The water employed for washing the lactose crystals is a good diluent, and the pH may be raised by means of slaked lime before precipitating the albumin at 90° to 95° C.

In its basic aspects, as illustrated in Example 1, the method of the invention converts skim milk into casein and acid cheese whey without adding any foreign material which would reduce the value of the acid whey, such as the anions of acids. The hydrogen ions are derived from the mineral acids, such as hydrochloric or sulfuric acid, which are employed for regenerating the cation-exchange resin in a conventional manner when the pH of the effluend from the resin column rises suddenly to indicate exhaustion of the resin. The cations removed from the casein or whey may be replaced in a simple manner as illustrated in Example 3, if so desired, and the original alkali metal ions may be replaced partly or entirely by calcium in this process.

The partial recycling of the acid whey in the process of the invention as illustrated in Example 2 has been found to result in a yield of lactose which is higher by about 5 to 6 percent than the yield of conventional processes in which the mother liquor from the lactose crystallization step is not returned to an earlier process step.

The manipulative steps employed in the process of the invention are not novel in themselves, and conventional dairy equipment may be employed for mixing liquids with liquids, or liquids with solids. The method employed for substantially separating solids from liquids may be equally conventional, and are not in themselves important for the success of the process. Filtration, decantation, and centrifuging may be resorted to interchangeably in many instances as will be readily apparent to those skilled in this art.

The casein precipitated by the method of the invention is relatively high in solids, low in mineral matter and of somewhat bland taste. Example 3 illustrates a preferred method of reducing the solids content, providing the excess basicity desired in white cheese such as pot cheese or cottage cheese, and improving the taste and flavor of the product by fermentation in the presence of relatively large amounts of calcium.

The removal of lactose and albumin from the whey prior to ion exchange resin treatment is particularly advantageous where casein and whey are separated from the skim milk, and the whey is evaporated in relatively small dairy plants, whereas the further processing of the concentrated whey is left to larger central plants. Each smaller plant produces approximately 80 to 85 tons of whey per 100 tons of skim milk processed, and the crude whey is evaporated to about one fifth of its original weight, that is, 16 to 17 tons, before shipment to the central plant. The central plant converts a portion of the concentrate to whey powder, and treats the remainder with cation-exchange material to produce 9 to 15 tons of modified whey of pH 1.8 which is returned to the smaller plant for treating another batch of 100 tons of skim milk. The tank trucks or other vehicles traveling back and forth between the two plants are approximately equally loaded with whey products on both trips.

It should be understood, of course, that the preceding disclosure relates only to preferred embodiments of the invention, and that it is intended to cover all modifications and variations of the examples of the invention chosen for the purpose of the disclosure which do not exceed the scope and spirit of the appended claims.

What is claimed is:

1. A method of precipitating casein from skim milk which comprises:
    (a) contacting whey with a cation exchange material in the H-form at a temperature low enough to prevent precipitation of albumin, the amount of said material being sufficient to reduce the pH value of said whey substantially below 4.3; and
    (b) mixing skim milk with an amount of said contacted whey sufficient to make the pH of the resulting mixture approximately 4.3 to 4.5, whereby casein is precipitated therefrom.

2. A method as set forth in claim 1, wherein said whey is evaporated prior to said contacting until lactose is precipitated therefrom, and the remainder of said whey is separated from said precipitated lactose, said remainder being contacted with said material.

3. A method as set forth in claim 1, wherein at least a portion of the albumin present in said whey is removed therefrom prior to said contacting.

4. A method as set forth in claim 1, wherein said precipitated casein is substantially separated from the liquid remainder of said mixture; said remainder is evaporated until lactose crystallizes therefrom; the crystallized lactose is substantially separated from the mother liquor; the pH of the mother liquor is adjusted to approximately 4.3 to 4.8; the adjusted mother liquor is heated to a temperature of approximately 90° to 95° C., whereby albumin is precipitated therefrom; the precipitated albumin is substantially separated from the residual liquid; said residual liquid is contacted with an amount of a cation exchange material in the H-form, sufficient to reduce the pH value of the liquid substantially below 4.3; and the contacted liquid is mixed with an amount of skim milk selected to make the pH value of the resulting mixture approximately 4.3 to 4.5, whereby casein is precipitated from said mixture.

5. A method as set forth in claim 4, wherein the pH of said mother liquor is adjusted by addition of rennet cheese whey having a pH of approximately 6.0.

6. A method as set forth in claim 1, wherein said precipitated casein is substantially separated from the liquid remainder of said mixture; at least a portion of the lactose present in said remainder is removed; the liquid of reduced lactose content is contacted with an amount of cation exchange material in the H-form sufficient to reduce the pH value of the liquid substantially below 4.3; and the contacted liquid is mixed with an amount of skim milk selected to make the pH value of the resulting mixture approximately 4.3 to 4.5, whereby casein is precipitated from said mixture.

7. A method as set forth in claim 1, wherein said precipitated casein is substantially separated from the liquid remainder of said mixture; at least a portion of the albumin present in said remainder is removed therefrom; the liquid of reduced albumin content is contacted with an amount of cation exchange material in the H-form sufficient to reduce the pH value of the liquid substantially below 4.3; and the contacted liquid is mixed with an amount of skim milk selected to make the pH value of the resulting mixture approximately 4.3 to 4.5, whereby casein is precipitated from said mixture.

References Cited

UNITED STATES PATENTS 2,807,608   9/1957   Smart et al. _____ 99—63 X

A. LOUIS MONACELL, *Examiner.*

S. E. HEYMAN, *Assistant Examiner.*

U.S. Cl. X.R.

99—54